(12) United States Patent
Enescu et al.

(10) Patent No.: US 10,574,331 B2
(45) Date of Patent: Feb. 25, 2020

(54) ANTENNA CO-LOCATION AND RECEIVER ASSUMPTIONS

(71) Applicant: NOKIA TECHNOLOGIES OY, Espoo (FI)

(72) Inventors: Mihai Enescu, Espoo (FI); Juha Pekka Karjalainen, Oulu (FI); Sami-Jukka Hakola, Kempele (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/300,508

(22) PCT Filed: May 5, 2017

(86) PCT No.: PCT/IB2017/052640
§ 371 (c)(1),
(2) Date: Nov. 9, 2018

(87) PCT Pub. No.: WO2017/195082
PCT Pub. Date: Nov. 16, 2017

(65) Prior Publication Data
US 2019/0238211 A1    Aug. 1, 2019

Related U.S. Application Data (60) Provisional application No. 62/334,197, filed on May 10, 2016.

(51) Int. Cl.
*H04B 7/08* (2006.01)
*H04B 7/024* (2017.01)
(Continued)

(52) U.S. Cl.
CPC ............. *H04B 7/088* (2013.01); *H04B 7/024* (2013.01); *H04B 7/0695* (2013.01); *H04L 5/005* (2013.01); *H04L 5/0025* (2013.01)

(58) Field of Classification Search
None
See application file for complete search history.

(56) References Cited

U.S. PATENT DOCUMENTS 6,349,208 B1 * 2/2002 Sexton .................... H04L 1/001
                                                370/332
6,785,259 B2 * 8/2004 Le .......................... H04L 29/06
                                                370/349
(Continued)

FOREIGN PATENT DOCUMENTS

WO      2015147717 A1    10/2015

OTHER PUBLICATIONS

International Search Report and Written Opinion corresponding to International Application No. PCT/IB2017/052640, dated Jun. 29, 2017.
(Continued)

Primary Examiner — Berhanu Tadese
(74) Attorney, Agent, or Firm — Squire Patton Boggs (US) LLP (57) ABSTRACT

Various communication systems may benefit from appropriate assumptions regarding physical or electrical characteristics of the systems. For example, fifth generation (5G) or similar communication systems may benefit from appropriate antenna co-location and receiver assumptions. A method can include receiving an indication of a set of co-location rules to apply from at least three sets of co-location rules. The method can also include applying the indicated set of co-location rules.

30 Claims, 7 Drawing Sheets

(51) Int. Cl.
　　　*H04B 7/06* (2006.01)
　　　*H04L 5/00* (2006.01)

(56) References Cited

U.S. PATENT DOCUMENTS

| | | | | |
|---|---|---|---|---|
| 7,142,875 B2* | 11/2006 | Kall | H04W 64/00 | 455/456.3 |
| 7,599,714 B2* | 10/2009 | Kuzminskiy | H04B 7/0691 | 343/725 |
| 7,765,184 B2* | 7/2010 | Makela | G06F 16/487 | 707/603 |
| 8,443,108 B2* | 5/2013 | Lehtola | H04L 67/125 | 707/610 |
| 9,467,811 B2* | 10/2016 | Nilsson | H04W 4/185 | |
| 9,769,807 B2* | 9/2017 | Jongren | H04L 5/0053 | |
| 9,867,120 B2* | 1/2018 | Ng | H04W 48/16 | |
| 10,015,771 B2* | 7/2018 | Rasanen | H04L 65/104 | |
| 10,085,202 B2* | 9/2018 | Ng | H04W 48/16 | |
| 10,141,986 B2* | 11/2018 | Yu | H04B 7/0639 | |
| 10,146,956 B2* | 12/2018 | Boldyrev | G06F 21/6245 | |
| 2003/0147539 A1* | 8/2003 | Elko | H04R 3/005 | 381/92 |
| 2004/0255302 A1* | 12/2004 | Trossen | H04L 29/06027 | 719/318 |
| 2005/0071510 A1* | 3/2005 | Belimpasakis | H04N 21/4126 | 709/250 |
| 2006/0002236 A1* | 1/2006 | Punkka | G04G 9/0076 | 368/21 |
| 2006/0212836 A1* | 9/2006 | Khushraj | G06F 16/954 | 715/866 |
| 2006/0246881 A1* | 11/2006 | Winkler | H04M 1/64 | 455/415 |
| 2007/0077968 A1* | 4/2007 | Kuzminskiy | H04B 7/0617 | 455/562.1 |
| 2007/0260780 A1* | 11/2007 | Hiipakka | G06F 1/3203 | 710/52 |
| 2008/0153488 A1* | 6/2008 | Ruhanen | H04L 29/12132 | 455/435.1 |
| 2010/0153568 A1* | 6/2010 | Uola | H04L 67/02 | 709/229 |
| 2010/0330940 A1* | 12/2010 | Sheynblat | H01Q 1/242 | 455/129 |
| 2012/0036271 A1* | 2/2012 | Patil | H04L 63/0272 | 709/227 |
| 2012/0287865 A1* | 11/2012 | Wu | H04W 74/006 | 370/329 |
| 2013/0201840 A1* | 8/2013 | Sorrentino | H04L 25/0204 | 370/252 |
| 2013/0279437 A1* | 10/2013 | Ng | H04W 48/16 | 370/329 |
| 2013/0301434 A1* | 11/2013 | Krishnamurthy | H04L 1/0026 | 370/252 |
| 2013/0301542 A1* | 11/2013 | Krishnamurthy | H04W 52/50 | 370/329 |
| 2013/0332279 A1* | 12/2013 | Kuusela | G06Q 30/02 | 705/14.57 |
| 2014/0003505 A1* | 1/2014 | Lainema | H04N 19/30 | 375/240.12 |
| 2014/0044061 A1* | 2/2014 | Yue | H04W 72/042 | 370/329 |
| 2014/0050113 A1* | 2/2014 | Rosa | H04W 52/0229 | 370/252 |
| 2014/0071838 A1* | 3/2014 | Jia | H04B 7/04 | 370/252 |
| 2014/0092827 A1* | 4/2014 | Jongren | H04L 5/0053 | 370/329 |
| 2014/0153488 A1* | 6/2014 | Koivisto | H04B 1/10 | 370/328 |
| 2014/0187179 A1* | 7/2014 | Ferguson | H01Q 3/24 | 455/77 |
| 2014/0270245 A1* | 9/2014 | Elko | H04R 3/005 | 381/92 |
| 2014/0293914 A1* | 10/2014 | Maattanen | H04W 72/1278 | 370/329 |
| 2014/0301303 A1* | 10/2014 | Roman | H04L 5/0073 | 370/329 |
| 2014/0314147 A1* | 10/2014 | Rusanovskyy | H04N 19/597 | 375/240.12 |
| 2014/0324527 A1* | 10/2014 | Kulkarni | G06Q 30/0261 | 705/7.29 |
| 2014/0348273 A1* | 11/2014 | Thomas | H04L 1/0036 | 375/344 |
| 2015/0111533 A1* | 4/2015 | Chandramouli | H04W 4/70 | 455/410 |
| 2015/0201369 A1* | 7/2015 | Ng | H04W 48/16 | 370/254 |
| 2015/0257130 A1* | 9/2015 | Lee | H04W 72/042 | 370/336 |
| 2015/0278298 A1* | 10/2015 | Boldyrev | G06F 17/278 | 707/754 |
| 2015/0365178 A1* | 12/2015 | Maattanen | H04B 17/345 | 370/329 |
| 2016/0241413 A1* | 8/2016 | Koskinen | H04L 12/189 | |
| 2017/0111098 A1* | 4/2017 | Kim | H04B 7/0626 | |
| 2017/0257822 A1* | 9/2017 | Harris | H04W 48/12 | |
| 2017/0288743 A1* | 10/2017 | Nam | H04B 7/024 | |
| 2017/0302341 A1* | 10/2017 | Yu | H04B 7/0639 | |
| 2017/0331577 A1* | 11/2017 | Parkvall | H04J 11/0079 | |
| 2017/0331670 A1* | 11/2017 | Parkvall | H04W 52/0274 | |
| 2018/0212800 A1* | 7/2018 | Park | H04L 25/03006 | |
| 2018/0241605 A1* | 8/2018 | Luo | H04L 25/03866 | |
| 2018/0242324 A1* | 8/2018 | Luo | H04L 25/03866 | |
| 2018/0288737 A1* | 10/2018 | Islam | H04W 68/02 | |
| 2018/0310309 A1* | 10/2018 | Koskela | H04W 28/0278 | |
| 2018/0359653 A1* | 12/2018 | Svedman | H04W 56/0015 | |
| 2019/0007116 A1* | 1/2019 | Chang | H04B 7/0684 | |
| 2019/0044584 A1* | 2/2019 | Lee | H04B 7/0417 | |
| 2019/0052320 A1* | 2/2019 | Yu | H04B 7/0639 | |
| 2019/0081740 A1* | 3/2019 | Kaikkonen | H04L 1/1812 | |
| 2019/0082334 A1* | 3/2019 | Nagaraja | H04W 24/04 | |
| 2019/0132829 A1* | 5/2019 | Bhattad | H04L 5/0023 | |
| 2019/0165880 A1* | 5/2019 | Hakola | H04W 72/042 | |
| 2019/0173560 A1* | 6/2019 | Chapman | H04B 17/10 | |
| 2019/0174527 A1* | 6/2019 | Park | H04L 5/0048 | |
| 2019/0181935 A1* | 6/2019 | Karjalainen | H01Q 3/24 | |
| 2019/0190669 A1* | 6/2019 | Park | H04W 56/001 | |
| 2019/0190747 A1* | 6/2019 | Park | H04L 5/005 | |

OTHER PUBLICATIONS

Extended European Search Report corresponding to EP Appln. No. 17795702A, dated Dec. 12, 2019.

ZTE: "Quasi Co-Location of Antenna Ports for FD-MIMO", 3GPP TSG RAN WG1 Meeting #83, Anaheim, USA, Nov. 15-22, 2015, R1-156824, 3 pages.

* cited by examiner

ANTENNA CO-LOCATION AND RECEIVER ASSUMPTIONS

BACKGROUND

Field

Various communication systems may benefit from appropriate assumptions regarding physical or electrical characteristics of the systems. For example, fifth generation (5G) or similar communication systems may benefit from appropriate antenna co-location and receiver assumptions.

Description of the Related Art

The 5G new radio standardization of the third generation partnership project (3GPP) may involve, at least as a future demonstration, a new radio system operating at a carrier frequency of 28 GHz with a system bandwidth of 800 MHz, namely 8×100 MHz. The main backbone of the system may be a hybrid multi antenna deployment at the base station (BS). In addition, the UE may need to perform analog beamforming.

The architecture of the system may be a hybrid architecture similar to the one used in frequency division (FD) multiple input multiple output (MIMO) in long term evolution (LTE). The architecture may differ in that the control plane may be beamformed. In order to do this, a so-called sweeping subframe has been introduced.

Figure 1:
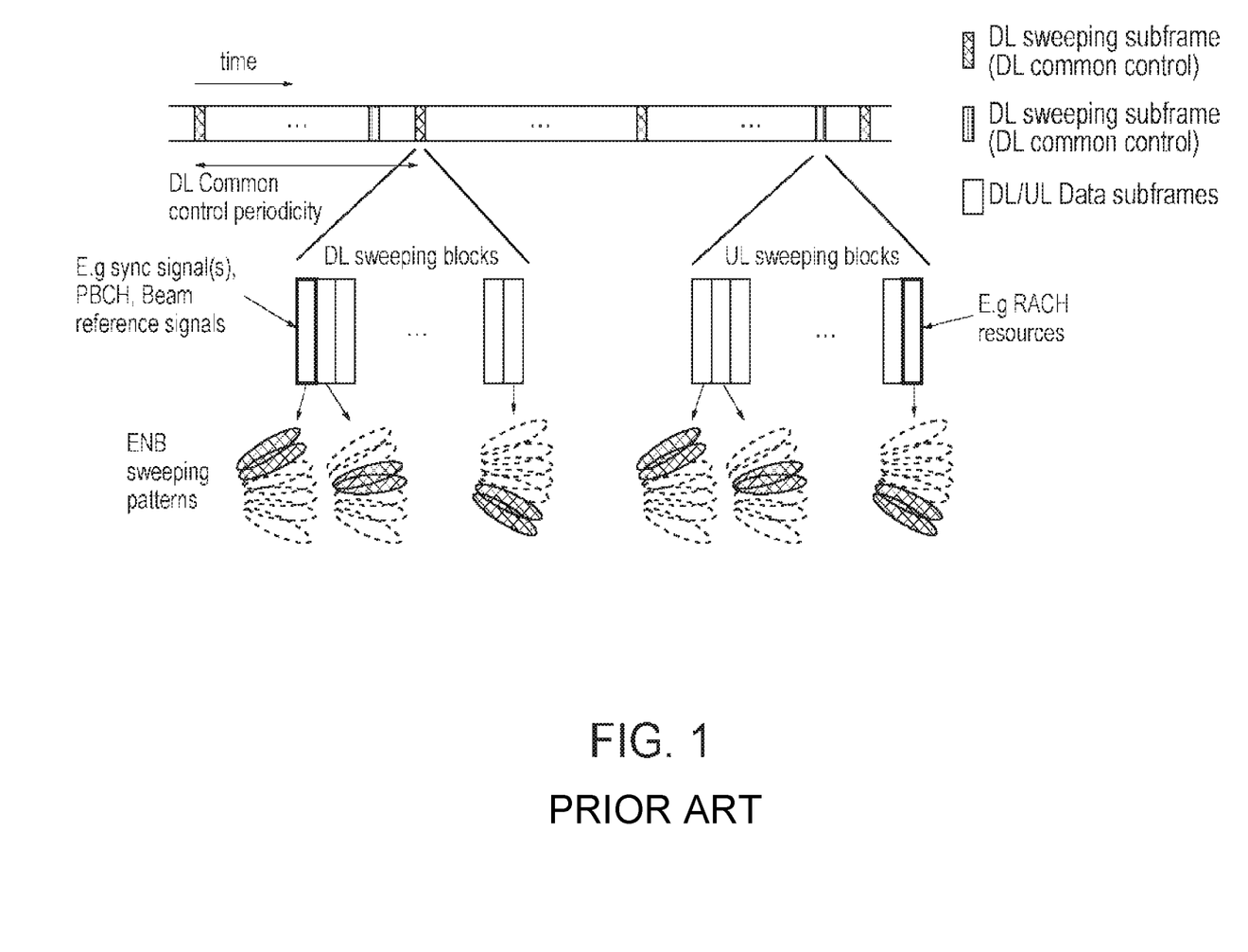
FIG. 1 illustrates the basic principles of operation of DL and UL sweeping subframes.

FIG. 1 illustrates the basic principles of operation of downlink (DL) sweeping blocks and uplink (UL) sweeping blocks. These principles are discussed in 3GPP document R1-162895, which is hereby incorporated herein by reference in its entirety.

After the UE finds the best DL analog/radio frequency (RF) beam, the UE can fine tune the UE's reception (Rx) beam in order to construct better receive/transmit filtering for reception and transmission (Tx).

Figure 2:
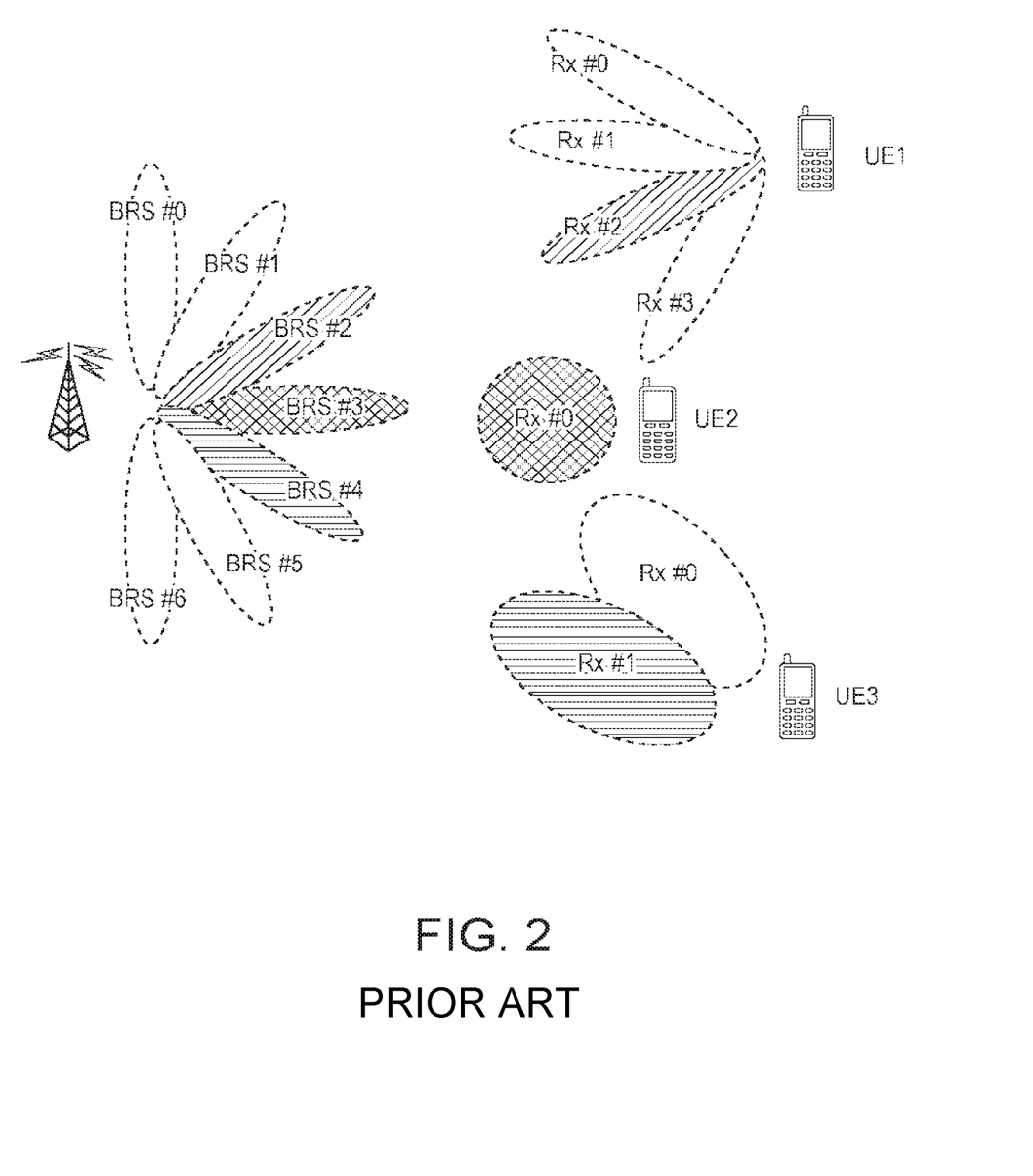
FIG. 2 illustrates BS and UE sweeping for Tx and Rx beam matching.

FIG. 2 illustrates base station (BS) and UE sweeping for Tx and Rx beam matching. FIG. 2 shows BS beams that are matched with UEs having different Rx beam resolutions. For example in FIG. 2, UE1 operates with 4 Rx beams and matches Rx beam #2 with BS beam #2. UE2 is an omnidirectional UE for whom the best DL beam is #3. UE3 is operating only 2 Rx beams and matches beam #1 with the BS beam #4.

As can be seen from FIG. 2, there can be different UE categories with different beamforming resolutions and capabilities. Related to UE capability, one important parameter can be the number of parallel RF beams at the UE. FIG. 2 illustrates UEs with one RF beam at a time whereas in FIG. 4 (discussed below) the UE has the capability of forming two RF beams at a time. 5G new radio operation may attempt to confine all the signals intended to a UE in the UE's allocated time and frequency resources, a so called "stay in the box" concept. This limits the flexibility of the UE in terms of utilizing multiple signals in order to improve channel estimates, maintain time and frequency synchronization and perform automatic gain control (AGC). On the other hand, the BS seeks for flexible operation.

Figure 3:
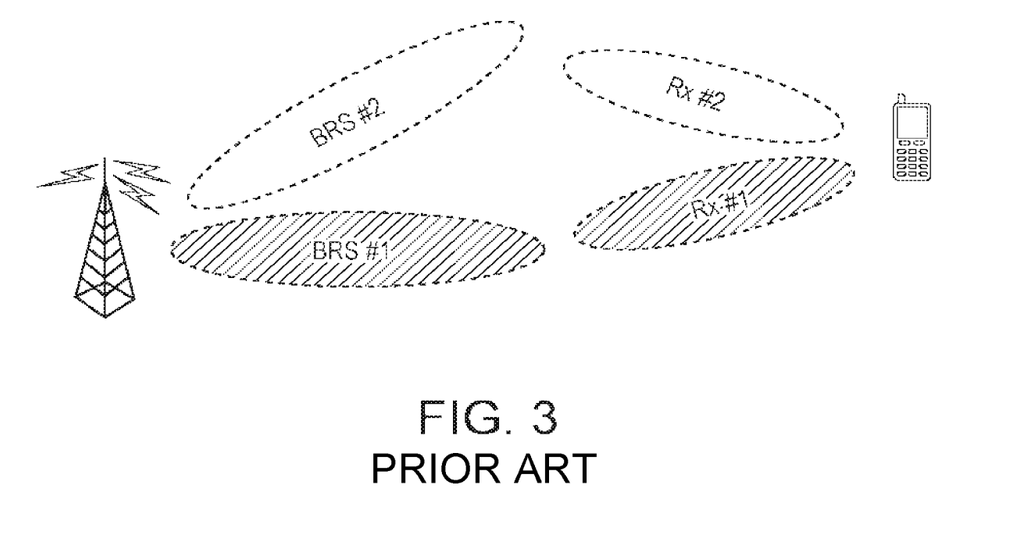
FIG. 3 illustrates multi-link operation between a BS and UE.

FIG. 3 illustrates multi-link operation between a BS and UE, such operation with the best and second best links between the BS and the UE. In this case the UE is able to report the best two DL RF beams, for example based on beam index and beam RSRP. The UE may also train the corresponding Rx beamformers for these two DL beams, Rx #1 and Rx #2 in FIG. 3.

Figure 4:
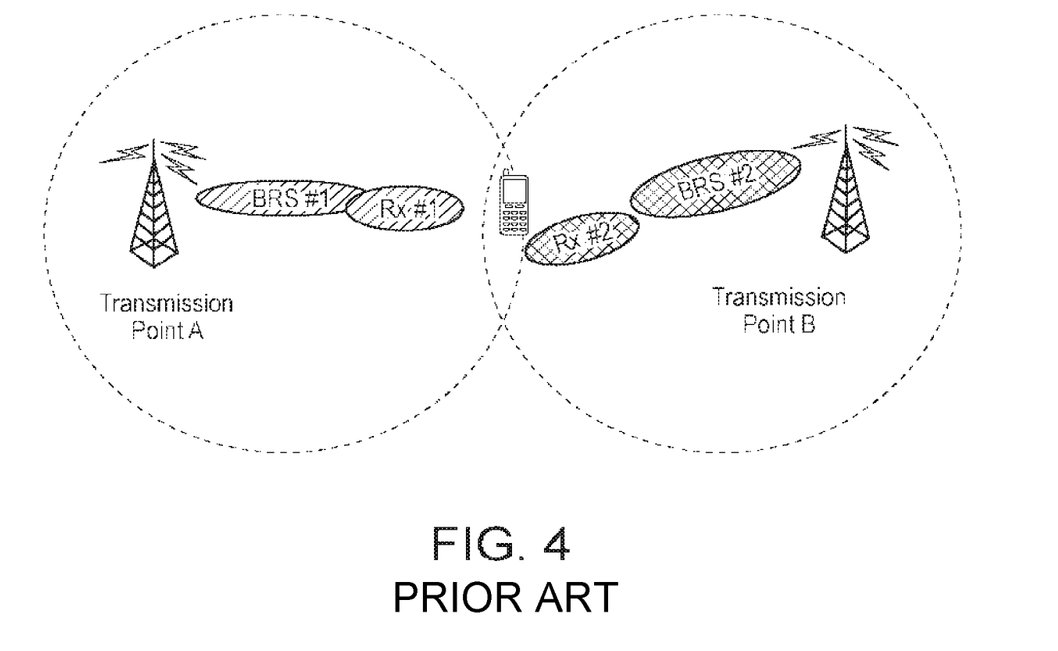
FIG. 4 illustrates multi-BS transmission to a UE.

FIG. 4 illustrates multi-BS transmission to a UE. More particularly, FIG. 4 illustrates a case of multi-BS operation where rank 1 transmissions are coming from 2 transmitters. Alternatively, dynamic transmission can happen only from one of the transmitters, similar to dynamic point selection in LTE coordinated multipoint (CoMP).

5G new radio operation is based on multiple types of reference symbols and signals, including beam reference symbols (BRS), beam refinement reference symbols (BRRS), demodulation reference signals (DMRS), channel status information reference signals (CSI-RS), phase noise compensation reference symbols (PC RS), AGC reference symbols. For example, BRS can be on ports 0-7 and BRRS on ports 31-38. BRS and BRRS can be collocated as BRRS associates a BRS. DMRS for control (CTRL) can be on ports 107-109. DMRS for data can be on ports 8-15, while CSI-RS can be on ports 16-31, and PC-RS can be on ports 60-67. The DMRS for data, CSI-RS, and PC-RS can all be collocated.

Thus, the UE may need to follow some specific rules with respect to assumptions regarding the co-location of the reference symbols, which may be in the same analog beam or in different analog beams coming from the same or different base stations. In addition, the UE may utilize some Rx beamforming which needs to be applied correctly with respect to the downlink transmission.

LTE has introduced so-called quasi-colocation signaling. This signaling indicates to the UE the assumption regarding the location in the same or different transmission points for DL RS, as described at 3GPP TS 36.213 section 7.1.9. In higher layers, the following parameters are considered in different parameter sets: crs-PortsCount-r11; crs-FreqShift-r11; mbsfn-SubframeConfigList-r11; csi-RS-ConfigZPId-r11; pdsch-Start-r11; qcl-CSI-RS-ConfigNZPId-r11; and zeroTxPowerCSI-RS2-r12.

A two bit indication is then formed, allowing the signaling of different parameter combinations from the above. For example, when the value of the "PDSCH RE Mapping and Quasi-Co-Location Indicator" field is 00, parameter set 1 is configured by higher layers; when the field value is 01, parameter set 2 is configured by higher layers; when the field value is 10, parameter set 3 is configured by higher layers; and when the field value is 11, parameter set 4 is configured by higher layers.

This two bit field is signalled in DL DCI 2D. The UE has essentially two assumptions for quasi-colocation of DL signals, according to 36.213 section 7.1.10. These can be classified as type A assumptions and type B assumptions. In type A, the UE may assume the LTE antenna ports 0-3, 7-30 of a serving cell are quasi co-located with respect to delay spread, Doppler spread, Doppler shift, and average delay.

In type B, the UE may assume the LTE antenna ports 15-30 corresponding to the CSI-RS resource configuration identified by the higher layer parameter qcl-CSI-RS-ConfigNZPId-r11 (defined in subclause 7.1.9) and the antenna ports 7-14 associated with the PDSCH are quasi co-located with respect to Doppler shift, Doppler spread, average delay, and delay spread.

The current 5G new radio 5G.213 specification also mentions linkages of the reference symbols. It states: "A UE is semi-statically configured with a list of active link IDs via radio resource control (RRC) configuration. Each active link ID is associated with a BRS port (logical beam index 6.7.4.3 in 5G.211) or a BRRS port (6.7.5 in 5G.211). Each BRRS resource is associated with a BRS port included in the configured list of active link IDs. A UE may assume that the transmit beam associated with the BRRS resource is spatially correlated with the transmit beam associated with the BRS port."

The same section also states: "The eNB designates one of the active link IDs as the scheduling link ID. The scheduling link ID will be indicated to the UE in subframe n and the UE will appropriately configure the UE Rx beams associated with the scheduling link ID in subframe n+k. The UE may assume that the transmit beams corresponding to the antenna ports associated with xPDCCH and xPDSCH are spatially correlated with the transmit beam associated with the scheduling link from subframe n+k"

Thus, in this approach the BRS and BRRS ports configured in same link are collocated. Moreover, the DMRS for control and data demodulation configured for one link are collocated. In addition, a "scheduling ahead with k subframe" function is introduced as "The scheduling link ID will be indicated to the UE in subframe n and the UE will appropriately configure the UE Rx beams associated with the scheduling link ID in subframe n+k.

SUMMARY

In a first aspect thereof the exemplary embodiments of this invention provide a method that comprises receiving by a user equipment an indication of a set of co-location rules to apply from at least three sets of co-location rules; and applying the indicated set of co-location rules.

In a further aspect thereof the exemplary embodiments of this invention provide an apparatus that comprises at least one data processor and at least one memory that includes computer program code. The at least one memory and computer program code are configured, with the at least one data processor, to cause the apparatus, at least to receive an indication of a set of co-location rules to apply from at least three sets of co-location rules; and apply the indicated set of co-location rules.

In another aspect thereof the exemplary embodiments of this invention provide a method that comprises determining a set of co-location rules to apply from at least three sets of co-location rules; and sending an indication of the determined set of co-location rules to a user equipment.

In yet another aspect thereof the exemplary embodiments of this invention provide an apparatus that comprises at least one data processor and at least one memory that includes computer program code. The at least one memory and computer program code are configured, with the at least one data processor, to cause the apparatus to determine a set of co-location rules to apply from at least three sets of co-location rules; and send an indication of the determined set of co-location rules to a user equipment.

In yet another aspect thereof the exemplary embodiments of this invention provide an apparatus that comprises means for receiving by a user equipment an indication of a set of co-location rules to apply from at least three sets of co-location rules; and means for applying the indicated set of co-location rules.

In yet one further aspect thereof the exemplary embodiments of this invention provide an apparatus that comprises means for determining a set of co-location rules to apply from at least three sets of co-location rules; and means for sending an indication of the determined set of co-location rules to a user equipment.

BRIEF DESCRIPTION OF THE DRAWINGS

For proper understanding of the invention, reference should be made to the accompanying drawings, wherein.

DETAILED DESCRIPTION

Certain embodiments provide a set of three co-location types, optionally including sub-types or further variations. Various designations may be applied to these categories, such as Category A, B, C, B1, B2, and so on, but it should be understood that the designations can be changed to other designations such as I, II, III, or 1, 2, 3, and so on, without changing the principles thereof.

Figure 5:
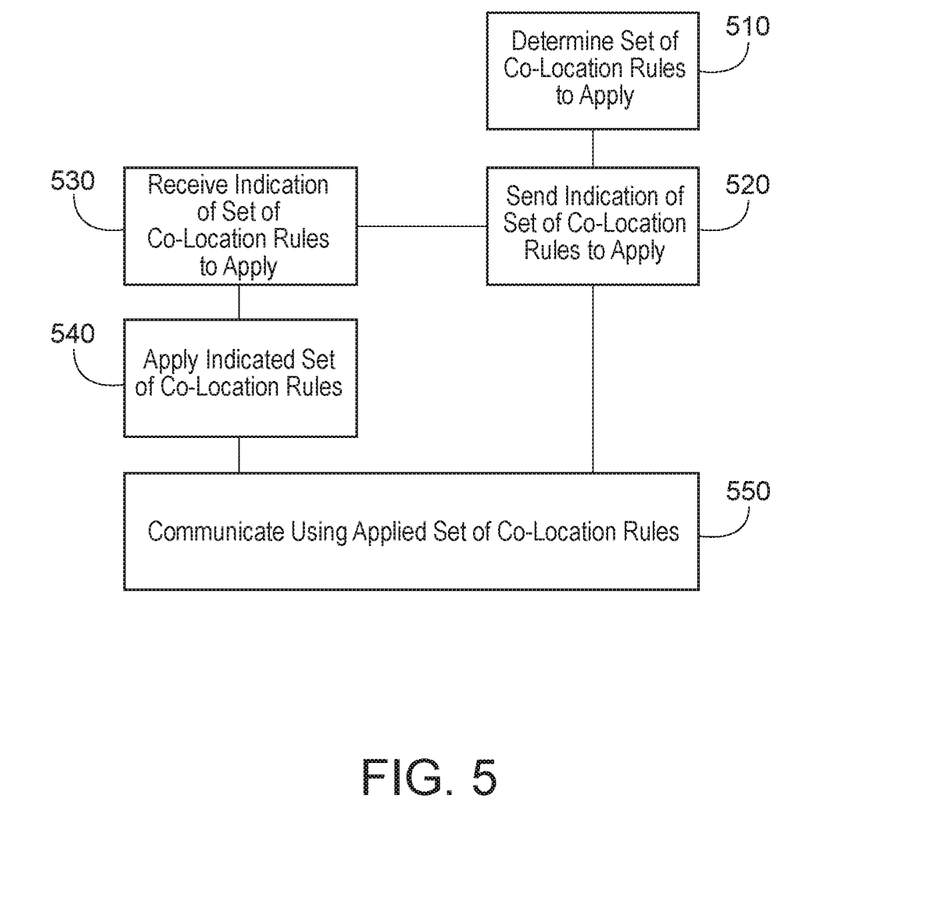
FIG. 5 illustrates a method according to certain embodiments.

FIG. 5 illustrates a method according to certain embodiments. As shown in FIG. 5, a method can include at 530, receiving, at a user equipment, an indication from a network element regarding which set of co-location rules to apply from at least three sets of co-location rules. This indication can be sent from the network element at 520, based on a determination of which set of co-location rules to apply at 510. The user equipment can then apply the indicated set of co-location rules at 540. Furthermore, at 550 the network element and user equipment can communicate with one another based on the applied set of co-location rules.

The indication can be implicit indication or an explicit indication. For example, the indication can be a three-bit indication indicating the particular set to be applied, such as Category A, Category B, or Category C. Additional bits can be used to indicate further variations within the categories, such as a sub-category B1, B2, or B3, or whether the UE receiver should use isotropic or non-isotropic operation. The indication can indicate information regarding user equipment beam forming in reception. The indication can also indicate which symbols or signals are co-located with one another.

Thus, certain embodiments can rely on defined antenna co-location rules as well as defined receiver beamforming rules. The UE may be configured to group the DL transmitted signals according to the UE beamforming filter/receiver (BF). Such grouping of DL signals with respect to Rx BF weights can be known to the transmitter.

The following co-location types are some examples. These rules may be subsets of larger groups of rules.

In antenna co-location type A, BRS, BRRS, CSI-RS, DMRS(CTRL) used for demodulation of control data, DMRS(Data) used for demodulation of data channel and RS for AGC are collocated with respect to delay spread, Doppler spread, Doppler shift, and average delay. This can imply same beam operation.

In antenna co-location type B1, BRS, BRRS, RS for AGC and DMRS for control demodulation are collocated with respect to delay spread, Doppler spread, Doppler shift, and average delay and there is isotropic Rx antenna use at the UE. This can imply that downlink control comes from a different analog beam with respect to DMRS for data demodulation. Thus, this rule set can decouple the DMRS for data demodulation from the rest of the reference symbols. This rule set can also indicate to the UE the use of isotropic antenna configuration, hence no UE beamforming should be utilized by the terminal. Antenna co-location (ACL) can be indicated in DCI.

In antenna co-location type B2, BRS, BRRS, RS for AGC and DMRS for control are collocated with respect to delay spread, Doppler spread, Doppler shift, and average delay and there is UE beamforming Rx antenna use at the UE. This co-location type indicates that one Rx beamforming assumption may be used for BRS, BRRS, RS for AGC and DMRS for control demodulation and a different UE beamforming Rx antenna assumption may be used for DMRS for data demodulation. This may imply that downlink control comes from a different analog beam with respect to the data channel. Hence, this rule set can decouple the DMRS for data from the rest of reference symbols. The UE may use one Rx beamformer for the collocated signals of BRS, BRRS, RS for AGC, DMRS for control demodulation and a different Rx beamforming filter for DMRS for data.

In antenna co-location type B3, BRS, BRRS, RS for AGC and DMRS for control demodulation are collocated with respect to delay spread, Doppler spread, Doppler shift, and average delay and there is UE beamforming Rx antenna use at the UE, where the same Rx beamforming assumption may be used for BRS, BRRS, RS for AGC, DMRS for control demodulation, and DMRS for data demodulation. This can imply that downlink control comes from a different analog beam with respect to DMRS for data demodulation. Hence this rule set can decouple the DMRS for data demodulation from the rest of the reference symbols. The UE may use the same Rx beamformer for the collocated signals of BRS, BRRS, DMRS for control demodulation, and also for DMRS for data demodulation.

In antenna co-location type C1, a set of BRS and BRRS ports and RS for AGC and one or more DMRS for control demodulation ports and one or more DMRS for data demodulation ports are collocated with respect to delay spread, Doppler spread, Doppler shift, and average delay; while another set of BRS and BRRS ports and RS for AGC and one or more DMRS for control demodulation ports and one or more DMRS for data demodulation ports are collocated with respect to delay spread, Doppler spread, Doppler shift, and average delay. Moreover, all the reference symbols (RSs) are using same UE beamforming processing. This may allow different ranks to come from different transmission points or different BRS beams in same transmission point.

In antenna co-location type C2, a set of BRS and BRRS ports and RS for AGC and one or more DMRS for control demodulation ports and one or more DMRS for data demodulation ports are collocated with respect to delay spread, Doppler spread, Doppler shift, and average delay. The same Rx beamforming assumption is used, hence the BS indicates that transmitted signals are from the same Rx group reported by the UE; while another set of BRS and BRRS ports and RS for AGC and one or more DMRS for control demodulation ports and one or more DMRS for data demodulation ports are collocated with respect to delay spread, Doppler spread, Doppler shift, and average delay and the same Rx beamforming assumption is used. This rule set may allow different ranks to be received from different transmission points or different BRS beams in the same transmission point and also allow the UE to use different Rx beamformers for the received ranks.

The above case may also cover the operation of different transmission points (TPs) transmitting different ranks to the UE, case in which the UE is using same Rx filtering for all the TPS, and yet the BRS, BRRS DMRS are collocated in terms of delay spread, Doppler spread, Doppler shift, and average delay on one or more TPs but not for all TPs.

It also possible that different ranks are transmitted from the same transmission point but from different beams. In this case, for example, the colocation can be the same for the reference symbols but the receiver assumptions might be different. Alternatively, the colocation may be different but the receiver assumptions may be the same.

Certain embodiments may thus variously permit the BS to make flexible use of the beams at the same site or to operate multi-site schemes such as CoMP.

Figures 6, 7:
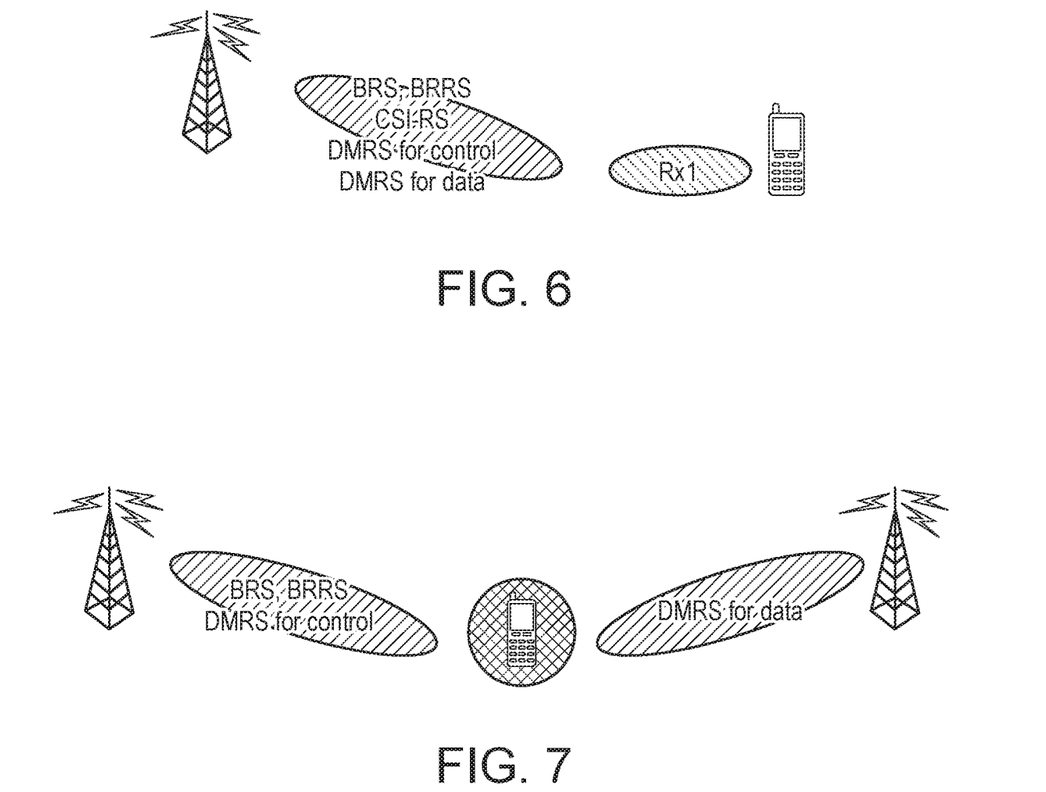
FIG. 6 illustrates a first co-location type, according to certain embodiments.
FIG. 7 illustrates a second co-location type, according to certain embodiments.

FIG. 6 illustrates a first co-location type, according to certain embodiments. As shown in FIG. 6, co-location type A may permit the straight forward transmission of DL data to the UE located in the UE's best reported analog beam. The UE may assume that all the reference symbols are co-located and hence may make use of the available samples to improve channel estimations.

FIG. 7 illustrates a second co-location type, according to certain embodiments. As shown in FIG. 7, co-location type B1 can link the BRS, BRRS and DMRS for control demodulation to the same transmission point and same analog beam. However, the BS may want to ensure possible beam switching. Thus, it may be indicated that the UE is to utilize an isotropic assumption in the receiver, and thus there can be an indication that UE beamforming should not be used. For example, it may be that data may come from a different beam/transmission point.

Figure 8:
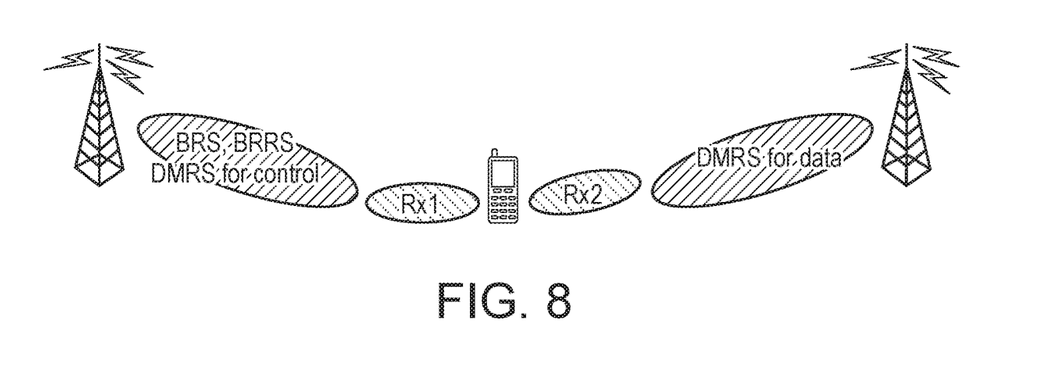
FIG. 8 illustrates a third co-location type, according to certain embodiments.

FIG. 8 illustrates a third co-location type, according to certain embodiments. As shown in FIG. 8, co-location type B2 can link BRS, BRRS, and DMRS for control demodulation and can indicate that all these signals are grouped using the same UE beamforming Rx1. The co-location type can also indicate that the DMRS for data demodulation comes with a different assumption on the UE beamforming Rx2 and hence from a different beam. There can also be a BRS in the DMRS for data beam even in such a case.

Figure 9:
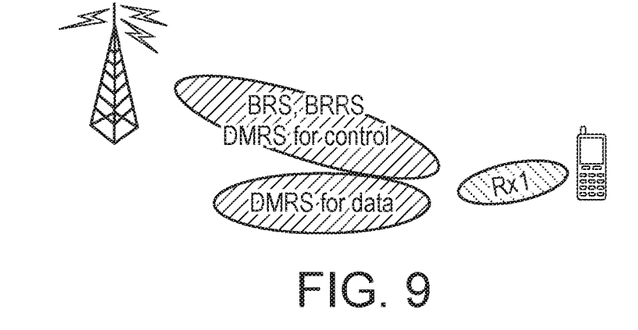
FIG. 9 illustrates a fourth co-location type, according to certain embodiments.

FIG. 9 illustrates a fourth co-location type, according to certain embodiments. As shown in FIG. 9, co-location Type B3 can indicate that BRS, BRRS, DMRS for control demodulation, and DMRS for data demodulation are grouped according to same UE beamforming Rx1. On the other hand, the DMRS for data demodulation may not be using the same co-location assumptions for delay spread, Doppler spread, Doppler shift, and average delay.

Figure 10:
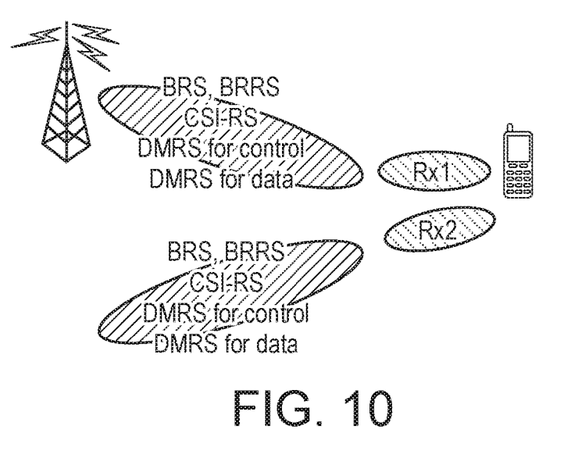
FIG. 10 illustrates a fifth co-location type, according to certain embodiments.

FIG. 10 illustrates a fifth co-location type, according to certain embodiments. As shown in FIG. 10, co-location Type C1 can permit different BRS beams or different transmission points, while groups of transmitted signals can use the same UE beamforming processing.

Figure 11:
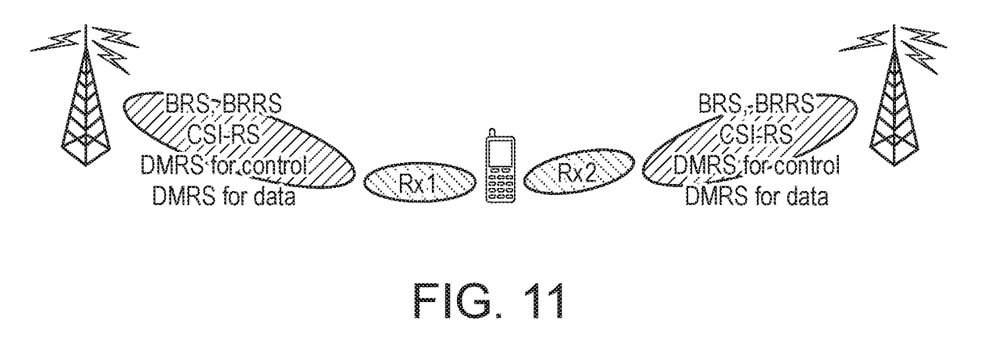
FIG. 11 illustrates a sixth co-location type, according to certain embodiments.

FIG. 11 illustrates a sixth co-location type, according to certain embodiments. As shown in FIG. 11, co-location Type C2 can permit different BRS or different point transmission, indicating that groups of transmitted signals are using the same UE beamforming processing.

Other variations on the above are also permitted. For example, there may be a slightly different operation when there are separate scheduling link definitions for xPDCCH and xPDSCH reception. For example, there may be two RX groups at UE: for xPDCCH reception, BRS ports of "primary" RX group applicable; and for xPDSCH reception, BRS ports of both RX groups applicable. The RX group indicated in grant (BRS port).

Alternatively, co-location types can be created with isotropic assumption in the UE receiver and also with non-isotropic assumption as mentioned below, three or more bits being used for this configuration. For example, Types A through C can be defined as set forth below and indicated with two bits, with isotropic UE receiver and isotropic UE receiver being a further option indicated in a third bit.

In this example, in type A BRS, BRRS, DMRS for control demodulation, and DMRS for data demodulation are collocated with respect to delay spread, Doppler spread, Doppler shift, and average delay. In type B, BRS, BRRS, and DMRS for control demodulation are collocated with respect to delay spread, Doppler spread, Doppler shift, and average delay. In type C, a set of BRS and BRRS ports and one or more DMRS for control demodulation ports and one or more DMRS for data demodulation ports are collocated with respect to delay spread, Doppler spread, Doppler shift, and average delay; while another set of BRS and BRRS ports and one or more DMRS for control demodulation ports and one or more DMRS for data demodulation ports are collocated with respect to delay spread, Doppler spread, Doppler shift, and average delay.

Figure 12:
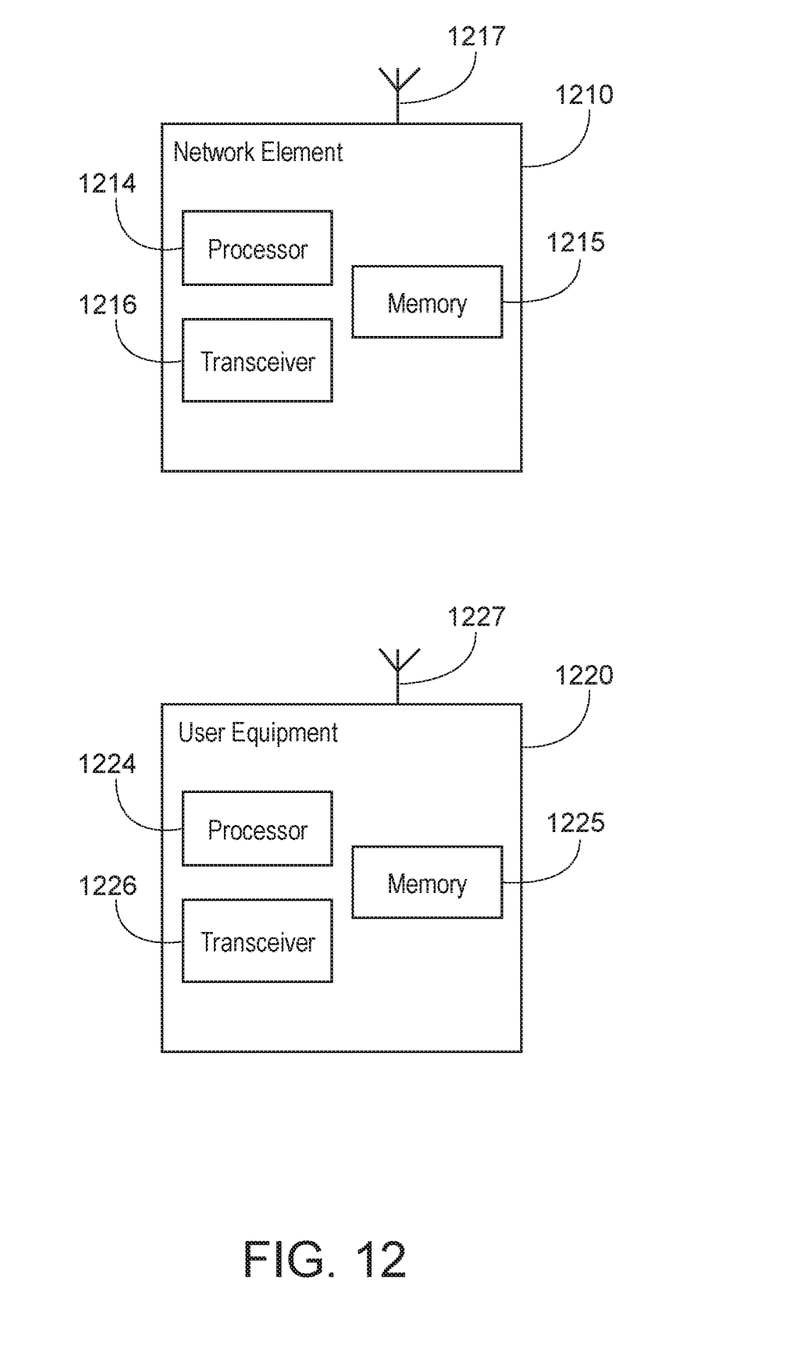
FIG. 12 illustrates a system according to certain embodiments.

FIG. 12 illustrates a system according to certain embodiments of the invention. It should be understood that each block of the flowchart of FIG. 5 may be implemented by various means or their combinations, such as hardware, software, firmware, one or more processors and/or circuitry. In one embodiment, a system may include several devices, such as, for example, network element 1210 and user equipment (UE) or user device 1220. The system may include more than one UE 1220 and more than one network element 1210, although only one of each is shown for the purposes of illustration. A network element can be an access point, a base station, an eNode B (eNB), or any other network element.

Each of these devices may include at least one processor or control unit or module, respectively indicated as 1214 and 1224. At least one memory may be provided in each device, and indicated as 1215 and 1225, respectively. The memory may include computer program instructions or computer code contained therein, for example for carrying out the embodiments described above. One or more transceiver 1216 and 1226 may be provided, and each device may also include an antenna, respectively illustrated as 1217 and 1227. Although only one antenna each is shown, many antennas and multiple antenna elements may be provided to each of the devices. Other configurations of these devices, for example, may be provided. For example, network element 1210 and UE 1220 may be additionally configured for wired communication, in addition to wireless communication, and in such a case antennas 1217 and 1227 may illustrate any form of communication hardware, without being limited to merely an antenna.

Transceivers 1216 and 1226 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 1220 may be a mobile station (MS) such as a mobile phone or smart phone or multimedia device, a computer, such as a tablet, provided with wireless communication capabilities, a vehicle, personal data or digital assistant (PDA) provided with wireless communication capabilities, portable media player, digital camera, pocket video camera, navigation unit provided with wireless communication capabilities or any combinations thereof. The user device or user equipment 1220 may be a sensor or smart meter, or other device that may usually be configured for a single location.

In an exemplifying embodiment, an apparatus, such as a node or user device, may include means for carrying out embodiments described above in relation to FIG. 5.

Processors 1214 and 1224 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 1215 and 1225 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 1210 and/or UE 1220, to perform any of the processes described above (see, for example, FIG. 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments of the invention may be performed entirely in hardware.

Furthermore, although FIG. 12 illustrates a system including a network element 1210 and a UE 1220, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

LTE Long Term Evolution
3GPP Third Generation Partnership Program
C-RNTI Cell RNTI
DCI Downlink Control Information
DL Downlink
BS Base Station
PDCCH Physical Downlink Control Channel
PDSCH Physical Downlink Shared Channel
BRS Beam Reference symbols
BRRS Beam Refinement Reference symbols
ACL Antenna co-location
DoA Direction of Arrival
DMRS Dedicated Reference Symbols
PC RS Phase noise compensation reference symbols
CTRL Control
FD MIMO Full Dimension Multiple Input Multiple Output
UE User Equipment
UL, U Uplink
WG Working Group
AGC Automatic Gain Control According to a first embodiment, a method can include receiving an indication of a set of co-location rules to apply from sets of co-location rules (for example, from at least three sets in certain embodiments). The method can also include applying the indicated set of co-location rules.

In a variant, the indication can comprise an implicit indication.

In a variant, the indication can comprise an explicit indication.

In a variant, the explicit indication can comprise a two-bit indication or a three-bit indication.

In a variant, the indication can comprise information regarding whether a receiver of the user equipment is isotropic or non-isotropic.

In a variant, the indication can be signaled dynamically or semi-statically.

In a variant, the indication can comprise information regarding user equipment beam forming configuration in reception.

In a variant, the indication can comprise information regarding which symbols or signals are co-located with one another.

In a variant, the indication can be configured to indicate colocation with respect to delay spread, Doppler spread, Doppler shift, and average delay.

In a variant, the indication can be configured to indicate colocation of a plurality of BRS, BRRS, DMRS for control demodulation, DMRS for data demodulation, and RS for automatic gain control.

In a variant, the indication can be configured to indicate different UE beamforming receiver assumptions for different received signals.

According to a second embodiment, a method can include determining a set of co-location rules to apply. The method can also include sending an indication of the determined set of co-location rules to a user equipment.

The second embodiment can include any of the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

We claim:

1. A method of operation by a user equipment, comprising: receiving, by the user equipment, an indication of a set of co-location rules to apply from at least three sets of co-location rules, wherein the indication comprises at least one of information regarding whether a receiver of the user equipment is isotropic or non-isotropic, information regarding user equipment beamforming configuration in reception, and information regarding which symbols or signals are co-located with one another; and applying the indicated set of co-location rules.

2. The method of claim 1, wherein the indication is an implicit indication.

3. The method of claim 1, wherein the indication is an explicit indication comprising a two-bit indication or a three-bit indication.

4. The method of claim 1, wherein the indication is signaled dynamically or semi-statically.

5. The method of claim 1, wherein the indication is configured to indicate co-location with respect to at least one of delay spread, Doppler spread, Doppler shift, and average delay.

6. The method of claim 1, wherein the indication is configured to indicate co-location of a plurality of beam reference symbols, beam refinement reference symbols, dedicated reference symbols for control demodulation, dedicated reference symbols for data demodulation, and reference symbols for automatic gain control.

7. The method of claim 1, wherein the indication is configured to indicate different user equipment beamforming receiver assumptions for different received signals.

8. A non-transitory computer-readable medium that contains software program instructions, where execution of the software program instructions by at least one data processor results in performance of operations that comprise execution of the method of claim 1.

9. A user equipment apparatus, comprising: at least one data processor; and at least one memory including computer program code, where the at least one memory and computer program code are configured, with the at least one data processor, to cause the apparatus at least to: receive an indication of a set of co-location rules to apply from at least three sets of co-location rules, wherein the indication comprises at least one of information regarding whether a receiver of the user equipment is isotropic or non-isotropic, information regarding user equipment beamforming configuration in reception, and information regarding which symbols or signals are co-located with one another; and apply the indicated set of co-location rules.

10. The apparatus of claim 9, wherein the indication is an implicit indication.

11. The apparatus of claim 9, wherein the indication is an explicit indication comprising a two-bit indication or a three-bit indication.

12. The apparatus of claim 9, wherein the indication is signaled dynamically or semi-statically.

13. The apparatus of claim 9, wherein the indication is configured to indicate co-location with respect to at least one of delay spread, Doppler spread, Doppler shift, and average delay.

14. The apparatus of claim 9, wherein the indication is configured to indicate co-location of a plurality of beam reference symbols, beam refinement reference symbols, dedicated reference symbols for control demodulation, dedicated reference symbols for data demodulation, and reference symbols for automatic gain control.

15. The apparatus of claim 9, wherein the indication is configured to indicate different user equipment beamforming receiver assumptions for different received signals.

16. A method of operation by a network element, comprising: determining a set of co-location rules to apply from at least three sets of co-location rules; and sending an indication of the determined set of co-location rules to a user equipment, wherein the indication comprises at least one of information regarding whether a receiver of the user equipment is isotropic or non-isotropic, information regarding user equipment beamforming configuration in reception, and information regarding which symbols or signals are co-located with one another.

17. The method of claim 16, wherein the indication is an implicit indication.

18. The method of claim 16, wherein the indication is an explicit indication comprising a two-bit indication or a three-bit indication.

19. The method of claim 16, wherein the indication is signaled dynamically or semi-statically.

20. The method of claim 16, wherein the indication is configured to indicate co-location with respect to at least one of delay spread, Doppler spread, Doppler shift, and average delay.

21. The method of claim 16, wherein the indication is configured to indicate co-location of a plurality of beam reference symbols, beam refinement reference symbols, dedicated reference symbols for control demodulation, dedicated reference symbols for data demodulation, and reference symbols for automatic gain control.

22. The method of claim 16, wherein the indication is configured to indicate different user equipment beamforming receiver assumptions for different received signals.

23. A non-transitory computer-readable medium that contains software program instructions, where execution of the software program instructions by at least one data processor results in performance of operations that comprise execution of the method of claim 16.

24. A network element apparatus, comprising: at least one data processor; and at least one memory including computer program code, where the at least one memory and computer program code are configured, with the at least one data processor, to cause the apparatus to: determine a set of co-location rules to apply from at least three sets of co-location rules; and send an indication of the determined set of co-location rules to a user equipment wherein the indication comprises at least one of information regarding whether a receiver of the user equipment is isotropic or non-isotropic, information regarding user equipment beamforming configuration in reception, and information regarding which symbols or signals are co-located with one another.

25. The apparatus of claim 24, wherein the indication is an implicit indication.

26. The apparatus of claim 24, wherein the indication is an explicit indication comprising a two-bit indication or a three-bit indication.

27. The apparatus of claim 24, wherein the indication is signaled dynamically or semi-statically.

28. The apparatus of claim 24, wherein the indication is configured to indicate co-location with respect to at least one of delay spread, Doppler spread, Doppler shift, and average delay.

29. The apparatus of claim 24, wherein the indication is configured to indicate co-location of a plurality of beam reference symbols, beam refinement reference symbols, dedicated reference symbols for control demodulation, dedicated reference symbols for data demodulation, and reference symbols for automatic gain control.

30. The apparatus of claim 24, wherein the indication is configured to indicate different user equipment beamforming receiver assumptions for different received signals.

* * * * *